United States Patent
Li et al.

(10) Patent No.: US 12,224,546 B2
(45) Date of Patent: Feb. 11, 2025

(54) ULTRASTABLE LASER SYSTEM BASED ON POLARIZATION-MAINTAINING OPTICAL FIBER

(71) Applicant: Shanghai Institute of Optics And Fine Mechanics, Chinese Academy of Sciences, Shanghai (CN)

(72) Inventors: Tang Li, Shanghai (CN); Lingke Wang, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 531 days.

(21) Appl. No.: 17/696,847

(22) Filed: Mar. 16, 2022

(65) Prior Publication Data

US 2022/0311202 A1   Sep. 29, 2022

(30) Foreign Application Priority Data

Mar. 29, 2021 (CN) .......................... 202110334941.9

(51) Int. Cl.
*H01S 3/13* (2006.01)
*H01S 3/067* (2006.01)
*H01S 3/10* (2006.01)

(52) U.S. Cl.
CPC ...... *H01S 3/06712* (2013.01); *H01S 3/10061* (2013.01); *H01S 3/1308* (2013.01)

(58) Field of Classification Search
CPC ............. H01S 3/06712; H01S 3/10061; H01S 3/1308; H01S 3/0085; H01S 3/1304; H01S 3/005; H01S 3/1305; H01S 3/1307; H01S 3/094076; H01S 3/117
See application file for complete search history.

(56) References Cited

U.S. PATENT DOCUMENTS

| 2004/0179561 A1* | 9/2004 | Muenter | H01S 3/137 372/32 |
| 2018/0180655 A1* | 6/2018 | Kuse | H04B 10/63 |
| 2019/0195994 A1* | 6/2019 | Orchard | G01S 7/354 |

FOREIGN PATENT DOCUMENTS

CN   108168728 A  *  6/2018  ........... G01B 11/168

* cited by examiner

*Primary Examiner* — Xinning (Tom) Niu
(74) *Attorney, Agent, or Firm* — Mei & Mark LLP; Manni Li

(57) ABSTRACT

An ultrastable laser system is based on a polarization-maintaining optical fiber. The ultrastable laser system comprises a laser device; acousto-optic modulators, a first beam splitter, a polarizer, an optical fiber interferometer comprising a second beam splitter, an optical fiber delay line, a third acousto-optic modulator, and a beam combiner; a beam combiner, a polarization beam splitter, photoelectric detectors, a frequency synthesizer, frequency mixers, a servo feedback circuit and a piezoelectric ceramic. The temperature interference is eliminated based on the characteristic that refractive indexes of a fast axis and a slow axis of the polarization-maintaining optical fiber differently change with a temperature, a vacuum structure can be avoided, and the ultrastable laser system has low cost, small system, simple structure and high signal stability.

5 Claims, 1 Drawing Sheet

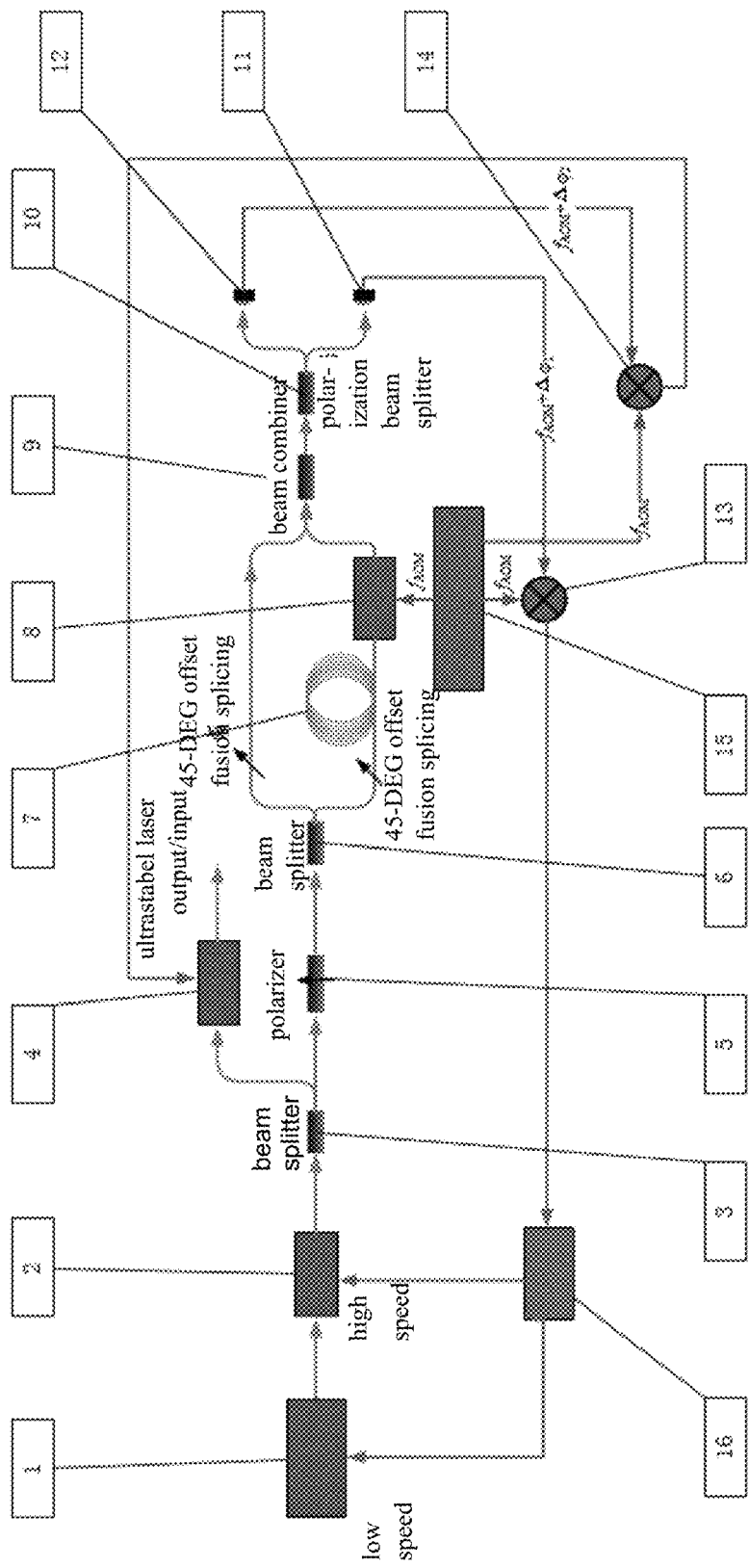

ULTRASTABLE LASER SYSTEM BASED ON POLARIZATION-MAINTAINING OPTICAL FIBER

CROSS-REFERENCE TO RELATED APPLICATION

The subject application claims priority to Chinese patent application CN202110334941.9 filed on Mar. 29, 2021 in China. The contents and subject matters of the Chinese priority application is incorporated herein by reference.

TECHNICAL FIELD

The present invention relates to the field of ultrastable laser, in particular, to an ultrastable laser system based on a polarization-maintaining optical fiber.

BACKGROUND ART

An ultrastable laser device is not only an important part of an atomic optical frequency standard, but also widely applied to the generation of ultralow noise microwave signals, the upgrading of fountain clocks, optical frequency transmission networks, the measurement of gravitational waves, the verification of theory of relativity, etc.

Currently, methods for achieving ultrastable laser with a narrow linewidth include the high-fineness Fabry-Perot cavity frequency stabilization method, the spectral-hole burning method, and the optical fiber interferometer frequency stabilization method. The high-fineness cavity frequency stabilization method is applied most widely, and the current ultrastable laser with the best performance in the world is generated by the method. However, the spectral-hole burning method and the optical fiber interferometer frequency stabilization method also show remarkable potentials, and particularly, a frequency stabilized laser device of an optical fiber interferometer has unique development advantages as comparison with a cavity frequency stabilization method.

The so-called frequency stabilized laser device of the optical fiber interferometer means that an optical fiber forms the optical fiber interferometer to discriminate a laser frequency, and then, an error signal is obtained and is fed back to a laser frequency control port, so that frequency locking is realized. The optical fiber interferometer includes a Michelson interferometer, a Mach-Zehner interferometer and a ring interferometer. The overall system of the optical fiber interferometer is of a full-optical fiber structure and is simple in structure and stable. The system may be miniaturized so as to be cheap in price. Meanwhile, the frequency is easy to tune. However, it also has some defects such as sensitivity to environmental parameters and greater temperature drift as comparison with an ultrastable cavity. Therefore, a vacuum structure is generally required to be adopted to shield heat exchange such as heat convection, which greatly limits the improvement on the complexity and volume of the system.

SUMMARY OF THE INVENTION

The present invention provides an ultrastable laser system based on a polarization-maintaining optical fiber to overcome defects in the existing technology. A modulation/demodulation module is adopted for error detection based on the characteristic that refractive indexes of a fast axis and a slow axis of the polarization-maintaining optical fiber differently change with a temperature, a loop of the fast axis is fed back to perform frequency-stabilized compensation on the basis of primary frequency stabilization of the slow axis, and thus, the output of ultrastable laser is achieved while the temperature of the optical fiber is detected.

The ultrastable laser system based on a polarization-maintaining optical fiber of the present invention comprises a laser device (1), a first acousto-optic modulator (2), a first beam splitter (3), a second acousto-optic modulator (4), a polarizer (5), an optical fiber interferometer comprising a second beam splitter (6), an optical fiber delay line (7), a third acousto-optic modulator (8), and a beam combiner (9), a polarization beam splitter (10), a first photoelectric detector (11), a second photoelectric detector (12), a first frequency mixer (13), a second frequency mixer (14), a radio frequency synthesizer (15), and a servo feedback circuit (16), wherein an output light of the laser device (1) is split into two beams after sequentially passing through the first acousto-optic modulator (2) and the first beam splitter (3); one beam enters the second acousto-optic modulator (4), and the other beam enters the second beam splitter (6) after being polarized by the polarizer (5); a first output end of the second beam splitter (6) is connected with a first input end of the beam combiner (9) in a manner of offset fusion splicing of an optical fiber, and a second output end of the second beam splitter (6) is connected with a second input end of the beam combiner (9) in the manner of offset fusion splicing of the optical fiber after sequentially passing through the optical fiber delay line (7) and the third acousto-optic modulator (8); the beams enter the polarization beam splitter (10) after being combined by the beam combiner (9), and the light is split into a first beam of light and a second beam of light by the polarization beam splitter (10) so as to be output; the first beam of light passes through the first photoelectric detector (11) to obtain a first beat frequency signal and is radiated to an RF end of the first frequency mixer (13), and the second beam of light passes through the second photoelectric detector (12) to obtain a second beat frequency signal and is radiated to an RF end of the second frequency mixer (16); the radio frequency synthesizer (15) outputs three paths of radio frequency signals, wherein the first path enters the third acousto-optic modulator (8) so as to be used for laser frequency shift; the second path enters an LO end of the first frequency mixer (13) to obtain a first frequency discrimination signal and enters the servo feedback device (16) to form a feedback loop for stabilizing the frequency of the laser device; and the third path enters an LO end of the second frequency mixer (14) to obtain a second frequency discrimination signal and enters the second acousto-optic modulator (4) so as to be modulated to output ultrastable laser.

In the present invention, the incident laser may be polarized to be emitted along a direction by arranging the polarizer.

In the present invention, the optical fiber interferometer is an unequal-arm interferometer of which an error signal is detected by adopting heterodyne detection.

In the present invention, a fast axis and a slow axis may rotate for a certain angle relative to a fast axis and a slow axis which are not subjected to offset fusion splicing by setting the offset fusion splicing of the optical fiber, so that the incident laser may be respectively projected on the fast axis and the slow axis, whereby the detection accuracy is improved.

In the present invention, the optical fiber is the polarization-maintaining optical fiber of which the fast axis and the slow axis has refractive indexes differently changing with a temperature, the other path of phase noise is extracted to be calibrated under the condition that a path of phase noise is coarsely locked, and thus, temperature interference may be eliminated.

In the present invention, by arranging the polarization beam splitter, a frequency-discriminated laser beam may be split into light p and light s which are then respectively detected by the photoelectric detectors.

In the present invention, optionally, an optical path of the device is a full-fiber optical path based on the polarization-maintaining optical fiber.

In the present invention, optionally, the interferometer is an unequal-arm Mach-Zehner optical fiber interferometer.

In the present invention, optionally, the error signal of the interferometer is detected by adopting heterodyne detection.

Compared with the existing technology, the present invention has the beneficial effects:

(1) based on the characteristic that the refractive indexes of the fast axis and the slow axis of the polarization-maintaining optical fiber differently change with the temperature in combination with an offset fusion splicing technology for an optical fiber, the other path of phase noise is extracted to be calibrated under the condition that a path of phase noise is coarsely locked, and then, the temperature interference of the optical fiber is eliminated by the servo feedback device; and (2) it is unnecessary to precisely control the temperature of the optical fiber in a vacuum environment, so that the complexity of the system is reduced, the structure of the ultrastable laser system is simpler and more convenient, meanwhile, the construction cost of the ultrastable laser system is greatly reduced, and the volume of the system is reduced.

BRIEF DESCRIPTION OF THE DRAWINGS

FIG. 1 shows one embodiment of the ultrastable laser system based on a polarization-maintaining optical fiber of the present invention.

DETAILED DESCRIPTION OF THE INVENTION

The present invention is further described in detail in connection with the drawing. The following embodiment is only intended to describe the present invention but not serves to limit the scope of the present invention. One of skilled in the art may modify the embodiment of the present invention without departing from the scope of the present invention.

In one embodiment of the present invention as shown in FIG. 1, the structure of the ultrastable laser system based on a polarization-maintaining optical fiber comprises a laser device (1), a first acousto-optic modulator (2), a first beam splitter (3), a second acousto-optic modulator (4), a polarizer (5), an optical fiber interferometer comprising a second beam splitter (6), an optical fiber delay line (7), a third acousto-optic modulator (8), and a beam combiner (9), a polarization beam splitter (10), a first photoelectric detector (11), a second photoelectric detector (12), a first frequency mixer (13), a second frequency mixer (14), a radio frequency synthesizer (15), and a servo feedback circuit (16).

Output laser of the laser device has the wavelength of 1550 nm, and the output light is split into two beams after sequentially passing through the first acousto-optic modulator and the first beam splitter, wherein one beam enters the second acousto-optic modulator, and the other beam enters the second beam splitter after being polarized by the polarizer; a first output end of the second beam splitter is connected with a first input end of the beam combiner in a manner of 45-DEG offset fusion splicing of an optical fiber, and a second output end of the second beam splitter is connected with a second input end of the beam combiner in the manner of 45-DEG offset fusion splicing of the optical fiber after sequentially passing through the optical fiber delay line and the third acousto-optic modulator; the beams enter the polarization beam splitter after being combined by the beam combiner, and the light is split into light s and light p by the polarization beam splitter, and a first high-speed photoelectric device and a second high-speed photoelectric device are respectively utilized to detect a beat frequency signal passing through a frequency discrimination device.

Laser noise is detected in a modulation/demodulation manner, and the radio frequency synthesizer is used to provide a signal $f_{AOM}=80$ MHz to drive an interferometric long-arm acousto-optic modulator to modulate light. In two paths of signals detected by the high-speed photoelectric devices, the first path of signal has the frequency of $f_{AOM}+\Delta\varphi_1$, enters the first frequency mixer to be subjected to frequency beat with the signal $f_{AOM}=80$ MHz generated by the radio frequency synthesizer to achieve a first frequency discrimination signal and enters the servo feedback device to form a feedback loop for stabilizing the frequency of the laser device; and the second path of signal has the frequency of $f_{AOM}+\Delta\varphi_2$, enters the second frequency mixer to be subjected to frequency beat with the signal $f_{AOM}=80$ MHz generated by the radio frequency synthesizer to achieve a second frequency discrimination signal which enters the second acousto-optic modulator so as to be modulated to output ultrastable laser.

In a specific application, for example, the error signal obtained by the first frequency mixer enters the servo feedback circuit, and the servo feedback circuit may feed a high-speed change signal back to the acousto-optic modulators by a voltage-controlled oscillator and feed a low-speed signal back to a piezoelectric ceramic frequency control port, so that the frequency of the laser device is stabilized. The offset fusion splicing is 45-DEG offset fusion splicing. The interferometer is an unequal-arm Mach-Zehner optical fiber interferometer. The beam splitters are polarization beam splitters.

To sum up, the ultrastable laser system based on the polarization-maintaining optical fiber adopted in the present embodiment has the following technical effects:

(1) the temperature interference is eliminated based on the characteristic that the refractive indexes of the fast axis and the slow axis of the polarization-maintaining optical fiber differently change with the temperature, the stability of laser output is greatly improved, and additional noise cannot be brought; and (2) the change of refractive indexes of linearly polarized light on the fast axis and the slow axis is detected in a manner of 45-DEG fusion splicing, so that the detection accuracy of the system is improved, meanwhile, a feedback system can be better designed by respective detection, and furthermore, the output laser is more stable.

We claim:

1. An ultrastable laser system based on a polarization-maintaining optical fiber, comprising
a laser device (1),
a first acousto-optic modulator (2),
a first beam splitter (3),
a second acousto-optic modulator (4),
a polarizer (5), an optical fiber interferometer, the optical fiber interferometer comprising a second beam splitter (6), an optical fiber delay line (7), a third acousto-optic modulator (8), and a beam combiner (9),
a polarization beam splitter (10),
a first photoelectric detector (11),
a second photoelectric detector (12),
a first frequency mixer (13),
a second frequency mixer (14),
a radio frequency synthesizer (15), and
a servo feedback circuit (16),
wherein an output light of the laser device (1) is split into two beams after sequentially passing through the first acousto-optic modulator (2) and the first beam splitter (3);
one beam enters the second acousto-optic modulator (4), and the other beam enters the second beam splitter (6) after being polarized by the polarizer (5);
a first output end of the second beam splitter (6) is connected with a first input end of the beam combiner (9) in a manner of offset fusion splicing of an optical fiber, and a second output end of the second beam splitter (6) is connected with a second input end of the beam combiner (9) in the manner of offset fusion splicing of the optical fiber after sequentially passing through the optical fiber delay line (7) and the third acousto-optic modulator (8);
the beams enter the polarization beam splitter (10) after being combined by the beam combiner (9), and the light is split into a first beam of light and a second beam of light by the polarization beam splitter (10) so as to be output;
the first beam of light passes through the first photoelectric detector (11) to obtain a first beat frequency signal and is radiated to an RF end of the first frequency mixer (13), and the second beam of light passes through the second photoelectric detector (12) to obtain a second beat frequency signal and is radiated to an RF end of the second frequency mixer (16);
the radio frequency synthesizer (15) outputs three paths of radio frequency signals, wherein the first path enters the third acousto-optic modulator (8) so as to be used for laser frequency shift; the second path enters an LO end of the first frequency mixer (13) to obtain a first frequency discrimination signal and enters the servo feedback device (16) to form a feedback loop for stabilizing the frequency of the laser device; and the third path enters an LO end of the second frequency mixer (14) to obtain a second frequency discrimination signal and enters the second acousto-optic modulator (4) so as to be modulated to output ultrastable laser.

2. The ultrastable laser system based on the polarization-maintaining optical fiber of claim 1, wherein the optical fiber interferometer is an unequal-arm interferometer of which an error signal is detected by adopting heterodyne detection.

3. The ultrastable laser system based on the polarization-maintaining optical fiber of claim 1, wherein in the manner of offset fusion splicing of the optical fiber, a fast axis and a slow axis rotate for a certain angle relative to a fast axis and a slow axis which are not subjected to offset fusion splicing, so that incident laser is respectively projected on the fast axis and the slow axis to improve detection accuracy.

4. The ultrastable laser system based on the polarization-maintaining optical fiber of claim 1, wherein the optical fiber is the polarization-maintaining optical fiber.

5. The ultrastable laser system based on the polarization-maintaining optical fiber of claim 1, wherein the polarization beam splitter splits a frequency-discriminated laser beam into light p and light s which are then respectively detected by the photoelectric detectors.

\* \* \* \* \*